(12) United States Patent
Toriyama

(10) Patent No.: US 7,507,489 B2
(45) Date of Patent: Mar. 24, 2009

(54) HONEYCOMB TYPE SOLID ELECTROLYTIC FUEL CELL

(75) Inventor: Akira Toriyama, Tokyo (JP)

(73) Assignee: Thinktank PHOENIX, Ltd., Tokyo (JP)

( * ) Notice: Subject to any disclaimer, the term of this patent is extended or adjusted under 35 U.S.C. 154(b) by 909 days.

(21) Appl. No.: 10/528,116

(22) PCT Filed: Mar. 12, 2004

(86) PCT No.: PCT/JP2004/003316

§ 371 (c)(1),
(2), (4) Date: Mar. 16, 2005

(87) PCT Pub. No.: WO2004/082050

PCT Pub. Date: Sep. 23, 2004

(65) Prior Publication Data

US 2006/0051641 A1      Mar. 9, 2006

(30) Foreign Application Priority Data

Mar. 14, 2003   (JP) .............................. 2003-070854

(51) Int. Cl.
*H01M 8/12* (2006.01)

(52) U.S. Cl. ............................. 429/30; 429/26; 429/31; 429/32; 429/33

(58) Field of Classification Search ...................... None
See application file for complete search history.

(56) References Cited

FOREIGN PATENT DOCUMENTS

| JP | 3-59956 | 3/1991 |
| JP | 11-297343 | 10/1999 |
| JP | 11-297344 | 10/1999 |

*Primary Examiner*—Jonathan Crepeau
*Assistant Examiner*—Tony Chuo
(74) *Attorney, Agent, or Firm*—Oblon, Spivak, McClelland, Maier & Neustadt, P.C.

(57) ABSTRACT

A SOFC type fuel cell being small in size and large in output while providing good efficiency and being excellent in starting characteristics and load variation characteristics, is presented. A honeycomb type solid-oxide fuel cell is formed of a honeycomb structural body having square cell in cross section, wherein cells adjacent to wall surfaces constituting a fuel pole cell (a) function as air pole cells (b) and cells adjacent to the corners of wall surfaces of the fuel pole cell and adjacent to wall surfaces constituting air pole cell function as cooling air cells (c), whereby fuel pole cells, air pole cells and cooling air cells are arranged in longitudinal and lateral rows so that cells of the same type appear in every other location.

12 Claims, 7 Drawing Sheets

HONEYCOMB TYPE SOLID ELECTROLYTIC FUEL CELL

TECHNICAL FIELD

The present invention relates to a honeycomb type solid-oxide fuel cell using any of a solid-oxide material, a fuel pole cell or an air pole cell as its structural body.

BACKGROUND ART

Fuel cells have been in the transition from the fuel cells of first generation which use a liquid substrate such as a phosphoric acid aqueous solution or fused carbonate for the fuel cells of second generation such as polymer electrolyte type fuel cells (hereinbelow, referred to as PEFC) or solid-oxide electrolyte type fuel cells (hereinbelow, referred to as SOFC). Among these fuel cells of second generation, PEFCs which use a fluorine or hydrocarbon type polymer electrolyte film as the electrolyte, have many disadvantages that the fuel used is limited to pure hydrogen ($H_2$); temperature control of very narrow range (from 65° C. to 85° C.) is required; a delicate control is necessary to determine the water ($H_2O$) content in the electrolyte film; a large quantity of expensive platinum catalyst has to be used; the durability is only about from 2,000 to 3,000 hours, and freezing should be avoided, consequently, they can not be used in a cold district because there is a danger of freezing. Further, since the fuel used is limited to pure hydrogen, it is necessary to restructure entirely the existent social infrastructure (e.g., gas, LPG, petroleum etc.) to be adapted to a hydrogen system, which requires a huge capital investment for social infrastructure. Cost for the restructuring would be added to cost for producing hydrogen, so that the unit price per unit calorific power will increase.

In addition, there are disadvantages that since the working temperature is low and therefor, the exhaust temperature is low, it is difficult to recover effectively exhaust heat in, for example, a co-generation system, and if the demand of heat is higher than the demand of electric power, a combustion aid using an expensive hydrogen fuel is needed, and accordingly, they can not always be the optimum energy-saving system from the viewpoint of heat balance.

Further, since PEFC requires expensive pure hydrogen fuel, it would be difficult to assert the advantage in using them in comparison with existent heat engines, hybrid cars etc. when efficiency including hydrogen production cost is considered.

On the other hand, SOFC allows using various kinds of hydrocarbon type fuel other than pure hydrogen and has the highest theoretical power generation efficiency among all kinds of fuel cells. However, since the conventional SOFC employed yttria-stabilized zirconia (YSZ) as its electrolyte, it was necessary to operate it at a high temperature of about 1,000° C., and therefor, ceramic having heat resisting properties was used for not only the fuel cell body but also main parts of the structural body. Accordingly, it was necessary to start it with a spending time from several hours to ten and several hours in order to prevent the breakage due to a thermal stress generated by an ununiform distribution of temperature. Further, it was unable to follow a rapid load change.

In recent years, a solid-oxide material such as scandium-stabilized zirconia (ScSZ) or lanthanum gallate type solid-oxide (LSGM), which has the same oxygen ion conductivity at from 650 to 800° C. as YSZ of 1,000° C., has been developed. Accordingly, a metal material can be used for many parts of the structural body, and flexibility in structure designs has remarkably been improved. However, the SOFC's main body was of the structure comprising cylindrical tubs or stacked circular disks. Accordingly, it had the disadvantages that a thermal stress generated in each part of the structural body could not sufficiently be reduced, and the starting time could not sufficiently be shortened.

Further, it was necessary for the conventional SOFC to keep the temperature inside the system uniformly to be in a high temperature state of about 1,000° C. in order to maintain power generation performance and to prevent the breakage due to a thermal stress applied to the materials and the structural body. Accordingly, it was necessary to suck exhaust gas and exhaust air through venturis or the like, the sucked gases being mixed and the gas mixture being forcibly circulated. Accordingly, the fuel and oxygen were supplied with low concentrations, whereby an output power per unit area of the fuel cell could not be increased.

Detailed description will be made on the structure and function of the system of a conventional typical SOFC employing a cylindrical cell unit, with reference to FIG. 7.

Fuel is supplied from a fuel inlet 61 and is passed through a cylindrical interior reforming device 62, meanwhile the temperature of the fuel is elevated. The fuel is reversed at an end portion to flow in a direction of arrow mark 63 along a fuel pole. Fuel exhaust gas containing unreacted fuel is passed through a returning line 64, and sucked by a fuel inlet venturi 65 to be returned to a fuel supply line. The surplus fuel exhaust gas is supplied to a combustor 74 through a fuel exhaust pipe 66.

On the other hand, air as an oxidizing agent is supplied from an air inlet 77 and flows through an air header 68 in a direction of arrow mark 69, meanwhile it is preheated. The air is reversed at an end of the cell unit to flow in a direction of an air pole 70 to thereby supply oxygen to the fuel cell. The air which has supplied oxygen to the fuel cell flows in an air exhaust pipe in a direction of arrow mark 71, and sucked by an air inlet venturi 72 to be returned to an air supply line. The surplus air flows in an exhaust pipe in a direction of arrow mark 73 and is mixed with the fuel exhaust gas in the combustor 74 for combustion, and the air after the combustion is discharged from an exhaust port 76 through an exhaust pipe 75.

In the conventional SOFC having the above-mentioned structure, it was necessary to elevate gradually the temperature from a cold state to a high-temperature state capable of generating power while the fuel gas and air were forcibly circulated, and the temperature of the entire cell unit was kept uniform to avoid the breakage due to a thermal stress. Accordingly, it took much time for warming-up from the starting of the apparatus to a full power state, thus, there was a drawback of being inconvenient.

Further, the conventional SOFC had such structure that the exhaust at the fuel supply side and the exhaust at the air supply side were sucked by using venturis, the sucked gases were mixed with supplied gases, the gas mixture is forcibly circulated in a thinned state, and in addition, the surplus exhaust fuel and the surplus exhaust air were mixed for combustion, and the combustion gas was discharged into atmosphere. Accordingly, the exhaust contains large quantities of unreacted fuel and unreacted oxygen, and therefor, sufficient power generation efficiency could not be expected.

On the other hand, JP-A-10-189023 and JP-A-11-297343 disclose fuel cells of honeycomb structure employing a solid oxide, as examples.

The fuel cells disclosed therein have a honeycomb structural body employing yttria-stabilized zirconia (YSZ) or scandium-stabilized zirconia (ScSZ) as a solid oxide. However, the disclosed fuel cells belong a honeycomb type fuel cell in which fuel pole cells and air pole cells adjacent to each other are arranged alternately in a form of so-called checker board design, and no means for removing heat generated in its honeycomb cells is provided. Accordingly, heat built up in the honeycomb to elevate the temperature in the honeycomb, and on the other hand, the outer peripheral portion of the honeycomb was cooled by heat radiation and cooldown, with the result that a large temperature difference was resulted between the central portion and the outer peripheral portion of the honeycomb, whereby the breakage of the honeycomb was caused due to a thermal stress by the temperature difference.

Accordingly, these fuel cells had such structure that in the same manner as the conventional structure shown in FIG. 7, the exhaust of fuel gas and exhaust air were sucked with venturis to mix them with supplied gases, and thinned gases as the result of mixing were circulated forcibly so that no large thermal stress was resulted in the honeycomb cells constituting the fuel cells. Further, in these fuel cells, it was necessary to elevate gradually the temperature with a sufficient warming-up time after the starting of the apparatus to a normal operation, hence, there was a drawback of being inconvenient.

Further, since the exhaust fuel gas and exhaust air were sucked for mixing by using the venturis and the gas mixture was circulated forcibly, fuel in the circulated fuel gas and oxygen in the circulated air were thinned and their concentrations were decreased. Further, since the concentration of unreacted fuel gas and the concentration of unreacted oxygen contained in the exhaust gas also were high, whereby the power generation efficiency could not sufficiently be increased. Further, the output density per unit surface area could not be increased.

The present invention is to solve the above-mentioned disadvantages and to provide a SOFC type fuel cell being small in size, large in output, having good efficiency and being excellent in starting characteristics and load variation characteristics, by cooling uniformly the inner portion of the honeycomb structural body as that a temperature difference at inner and outer portions of the fuel cell can be reduced to thereby prevent the generation of a thermal stress, by supplying, to the fuel cell, fuel and air of high concentration without being thinned, and by utilizing remaining unreacted fuel in fuel exhaust gas at the fuel cell outlet and the remaining unreacted oxygen in exhaust air to generate power until the fuel and the oxygen reach sufficiently low concentrations.

DISCLOSURE OF THE INVENTION

The present invention has been made to achieve the above-mentioned object and to provide the honeycomb type solid-oxide fuel cell described below.

(1) A honeycomb type solid-oxide fuel cell formed of any of a solid-oxide material, a fuel pole material and an air pole material and having a honeycomb structural body comprising rectangular cells in cross section, wherein cells adjacent to wall surfaces constituting a fuel pole cell of the fuel cell function as air pole cells and cells adjacent to the corners of wall surfaces of the fuel pole cell and adjacent to wall surfaces of an air pole cell function as cooling air cells, whereby fuel pole cells, air pole cells and cooling air cells are arranged in longitudinal and lateral directions so that cells of the same type appear in every other location.

(2) A honeycomb type solid-oxide fuel cell having fuel pole cells, air pole cells and cooling air cells which form a honeycomb structural body comprising square cells in cross section, said honeycomb structural body being made of any of a solid-oxide material, a fuel pole material and an air pole material, wherein a fuel cell group is formed by stacking at least two honeycomb type fuel cells in each of which cells adjacent to wall surfaces constituting a fuel pole cell of the fuel cell function as air pole cells and cells adjacent to the corners of wall surfaces of the fuel pole cell and adjacent to wall surfaces of an air pole cell function as cooling air cells, whereby fuel pole cells, air pole cells and cooling air cells are arranged in longitudinal and lateral directions so that cells of the same type appear in every other location, and fuel poles and air poles of the mutually adjacent honeycomb type fuel cells are connected with inter-connectors to form a series connection so that an electric power is taken by collectors provided at both ends of said group of the fuel cells.

(3) The honeycomb type solid-oxide fuel cell according to the above-mentioned (1) or (2), wherein the honeycomb structural body is made of a solid-oxide material, the fuel pole cells are formed by providing a fuel pole on the inner surfaces of cells of the honeycomb structural body and the air pole cells are formed by providing an air pole on the inner surfaces of the cells which are adjacent to the wall surfaces of the fuel pole cells.

(4) The honeycomb type solid-oxide fuel cell according to the above-mentioned (1), (2) or (3), wherein the cells have the same square shape in cross section.

(5) The honeycomb type solid-oxide fuel cell according to the above-mentioned (1), (2) or (3), wherein the fuel pole cells have a square shape in cross section, the air pole cells have a rectangular shape in cross section and have a wall surface of the fuel pole cell as a longer side, and the cooling air cells have a square shape in cross section and have a shorter side of the air pole cells as a side, or have a circular shape the diameter of which is the same as the shorter side of the air pole cells.

(6) The honeycomb type solid-oxide fuel cell according to any one of the above-mentioned (1) to (5), wherein a part or the entirety of the wall surfaces of the fuel pole cells, the air pole cells and the cooling air cells each having a rectangular shape in cross section is curved or corrugated.

(7) The honeycomb type solid-oxide fuel cell according to any one of the above-mentioned (2) to (6), wherein a first collector provided with fuel cell closing surfaces and flow passages for the air pole cells and the cooling air cells is connected to an end of the honeycomb type fuel cell located at an end of the fuel cell group, and an air inlet/outlet unit in which cooling air conduits are inserted is connected to the first collector;

a second collector in which flow passages for the fuel pole cells, flow passages for the air pole cells and flow passages for the cooling air cells are formed is connected to an end of the honeycomb type fuel cell located at the other end of the fuel cell group; an air reversing chamber and an exhaust fuel collecting chamber through which fuel supply pipes are penetrated are connected sequentially to the second collector, and a fuel supply header for supplying fuel is connected to the exhaust fuel collecting chamber, and, the fuel supply pipes which extend from an end of the exhaust fuel collecting chamber through the air reversing chamber and the second collector to the vicinity of the air inlet/outlet-side surface of the fuel pole cells are inserted into the fuel pole cells with gaps to the inner surfaces of the cells.

(8) The honeycomb type solid-oxide fuel cell according to any one of the above-mentioned (1) to (7), wherein the direction of air flowing in the cooling air cells is made opposite to the direction of reacting air flowing in the air pole cells to form a counter flow.

(9) The honeycomb type solid-oxide fuel cell according to any one of the above-mentioned (6) to (8), wherein a plurality of functional parts of the constituent members comprising honeycomb type fuel cells, first collector, second collector, air reversing chamber, exhaust fuel collecting chamber and fuel supply pipes which constitute the honeycomb type solid-oxide fuel cell, are formed integrally or connected integrally.

(10) The honeycomb type solid-oxide fuel cell according to the above-mentioned (7), wherein a fuel reforming catalyst is filled in the fuel supply pipes for the reformulation of the fuel in the fuel supply pipes.

(11) The honeycomb type solid-oxide fuel cell according to any one of the above-mentioned (1) to (10) wherein the solid electrolyte is yttria-stabilized zirconia (YSZ), scandium-stabilized zirconia (ScSZ), a lanthanum gallate type solid electrolyte (LSGM, LSGMC), or a solid electrolyte of, e.g. $C12A7 (12CaO \cdot 7Al_2O_3)$ having $O^-$ or $O^{2-}$-ion conductive properties or a solid electrolyte having $H^+$ or $H^-$-ion conductive properties.

EXPLANATION OF REFERENCE NUMERALS

1: Honeycomb structural body, 2: Fuel pole, 3: Fuel pole cell, 4: Air pole, 5: Air pole cell, 6: Cooling air cell, 13: Interconnector, 15: Air pole interconnector, 16: Fuel pole interconnector, 17: Honeycomb fuel cell, 17a: First stage honeycomb fuel cell, 17b: Second stage honeycomb fuel cell, 17n: N-th stage honeycomb fuel cell, 18: Stacked honeycomb fuel cell, 25: Air inlet/outlet-side surface, 26: Air inlet/outlet-side collecting/insulating unit, 29: First collector, 30: Insulator, 31: Air inlet/outlet unit, 32: Cooling air conduit, 33: Space, 34: Exhaust port, 35: Header portion, 37: Fuel-supply-side end surface, 38: Second collector, 39: Insulator, 40: Fuel-supply-side collecting/insulating unit, 41: Fuel-supply-side end surface, 42: Fuel pole conduit, 43: Air reversing chamber, 44: Air reversing unit, 45: End surface, 46: Fuel supply pipe, 47: Exhaust fuel collecting chamber, 48: Fuel exhaust gas outlet, 49: Fuel exhaust gas unit, 51: Fuel-inlet-side end surface, 52: Fuel supply header, 61: Fuel inlet, 62: Interior reforming device, 64: Returning line, 65: Fuel inlet venturi, 66: Fuel exhaust pipe, 67: Air inlet, 68: Air header, 70: Air pole, 71: Air exhaust pipe, 72: Air inlet venturi, 74: Combustor, 75: Exhaust pipe, 76: Exhaust port, 77: Air inlet

BEST MODE FOR CARRYING OUT THE INVENTION

The structure and function of the honeycomb type solid-oxide fuel cell according to the present invention will be described in more detail with reference to FIGS. 1 to 3. However, the attached figures show some examples in order to facilitate understanding of the fuel cell of the present invention, and therefor, the present invention should not be limited thereto. In the present invention, the honeycomb structural body (hereinbelow, it may be referred to as the honeycomb) can be formed of any of a solid-oxide material, a fuel pole material and an air pole material. However, generally, the solid-oxide material is preferred. Even when the honeycomb structural body is formed of the fuel pole material or the air pole material, the entire structures are all the same except that either the fuel pole or the reactive air pole has a double film structure comprising an electrolyte film and an electrode film. Accordingly, description hereinbelow will be made about an embodiment in which the honeycomb structural body is formed of the solid oxide.

Figure 1:
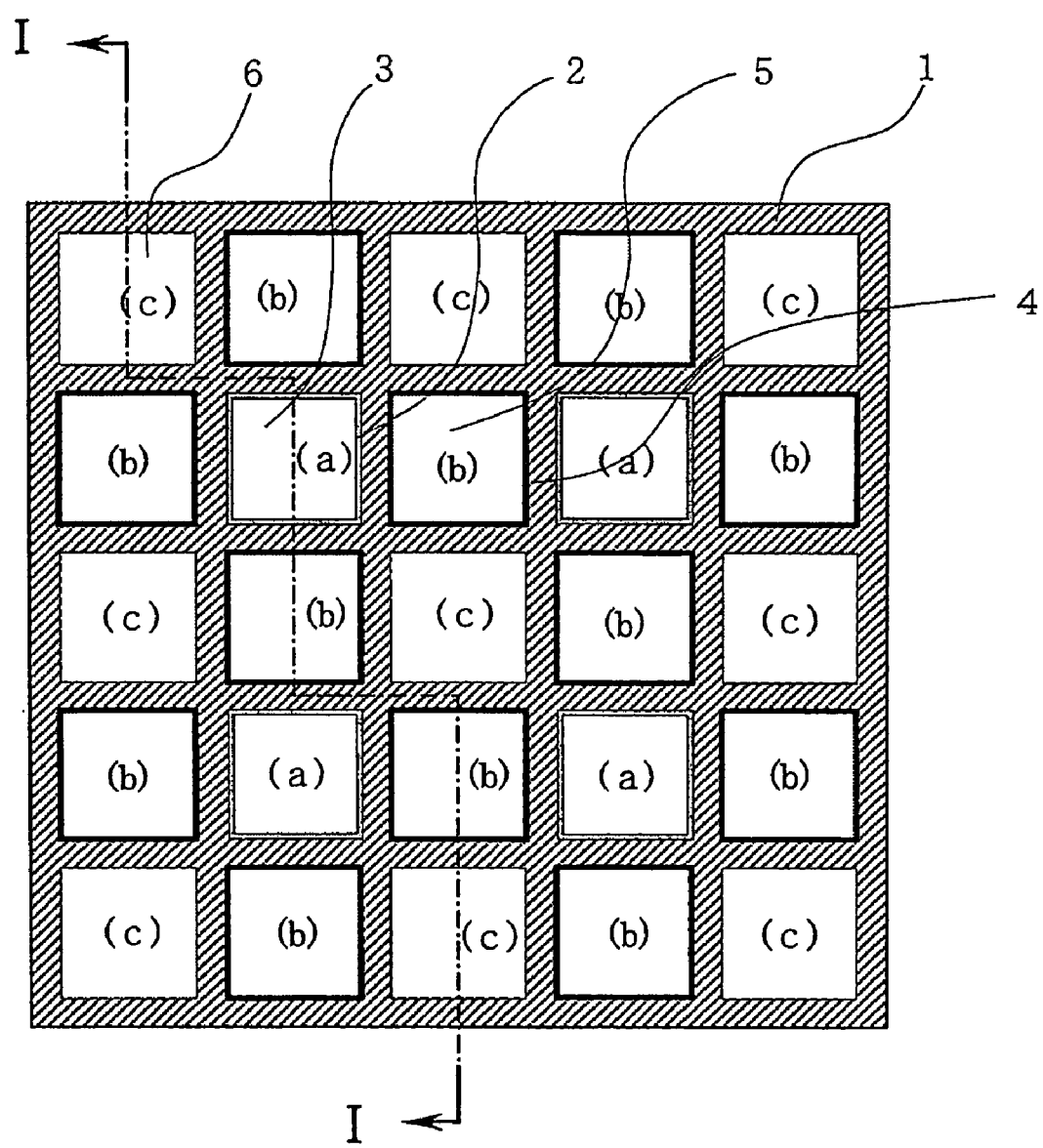
FIG. 1 is a simplified cross-sectional view of the fuel cell according to an embodiment of the present invention.

The solid-oxide fuel cell of the present invention comprises, as shown in FIG. 1, fuel pole cells 3 (indicated by (a) in the figure) provided with fuel poles 2 formed on the inner surfaces of cells of solid-oxide honeycomb 1 having a rectangular shape in cross section and having both ends opened, each fuel pole being formed by coating or joining followed by sintering, air pole cells 5 (indicated by a symbol (b) in the figure) provided with air poles 4 formed on the inner surfaces of cells adjacent to wall surfaces constituting the fuel pole cells, each air pole being formed by coating or joining followed by sintering, and cooling air cells 6 (indicated by a symbol (c) in the figure) adjacent to the corners of wall surfaces of the fuel pole cells 3 and adjacent to wall surfaces of the air pole cells 5 which are located at both sides of the corners.

With such construction, the fuel pole cells 3, the air pole cells 5 and the cooling air cells 6 are arranged in alignment in longitudinal and lateral directions so that cells of the same type appear in every other location, whereby the honeycomb 1 has a regular arrangement of the cells as shown in FIG. 1.

In the above-mentioned arrangement of the fuel pole cells 3, the air pole cells 5 and the cooling air cells 6, the fuel pole cells 3 have the wall surfaces which constitute cells, and all these wall surfaces are adjacent to the air pole cells 5. On the other hand, the cooling air cells 6 have the wall surfaces which are all adjacent to the air pole cells 5. Accordingly, it is possible to assure cooling passages capable of cooling uniformly the inner portion of the honeycomb 1. In FIG. 1, all the cells having a square or rectangular shape in cross section are arranged in a grid form. However, each cell may have a rhomboid shape in cross section. Here, the direction of the cross-section of each cell is a direction perpendicular to the passage of each cell of the honeycomb 1. Further, the cross-sectional shape of the honeycomb 1 is not limited to the rectangular shape as shown in this embodiment.

Figure 2:
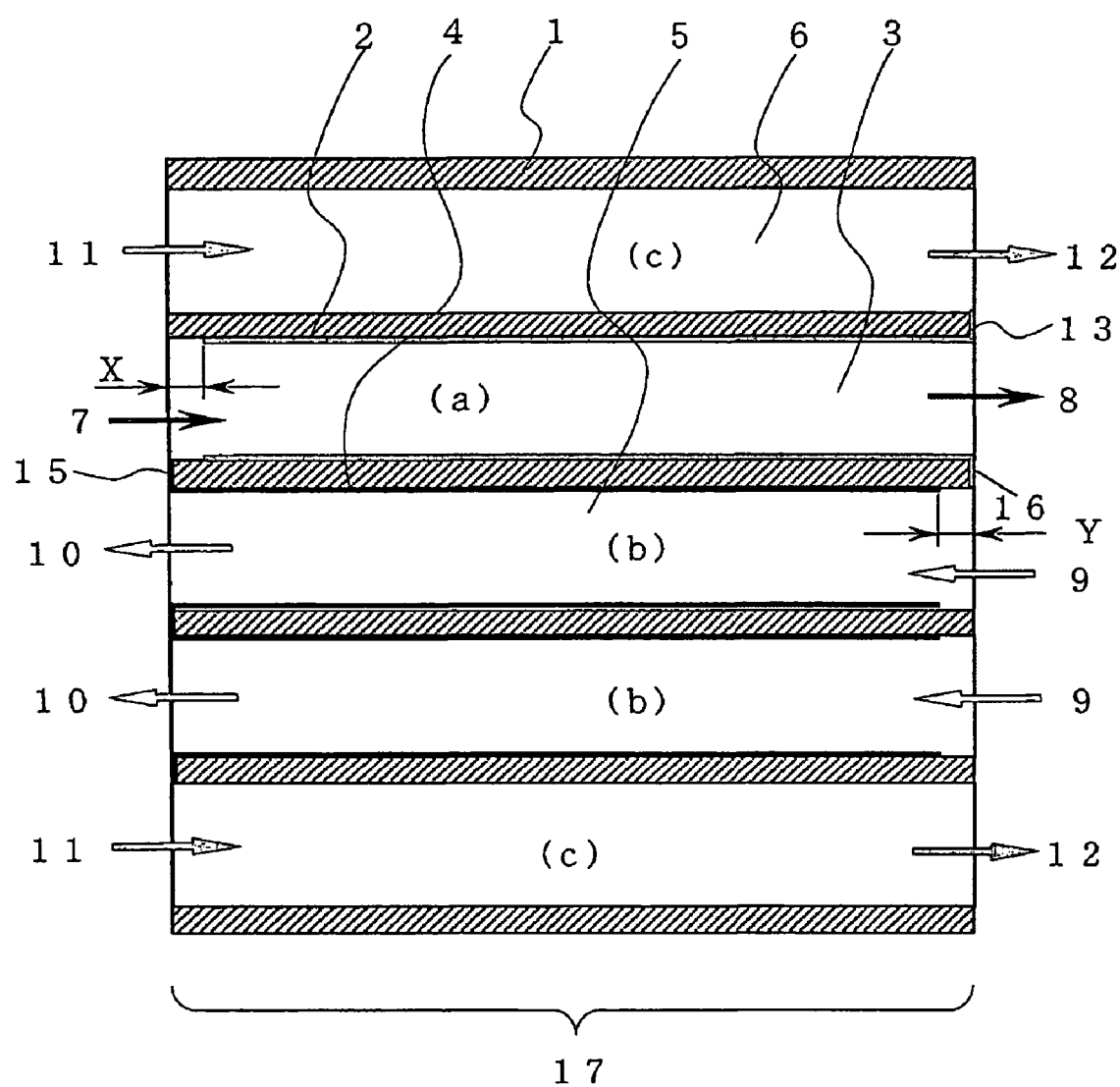
FIG. 2 is a simplified cross-sectional view taken along a line I-I in FIG. 1.

FIG. 2 is a cross-sectional view taken along a line I-I in FIG. 1. Fuel is passed through a fuel pole cell 3 from a direction of arrow mark 7 to that of arrow mark 8 in FIG. 2. On the other hand, reacting air is passed as a counter flow from a direction of arrow mark 9 to that of arrow mark 10 so as to oppose the flow direction of the fuel. Accordingly, a local electromotive force from the inlet side to the outlet side for the fuel can be equalized.

It is desirable that air flowing in the cooling air cell 6 be passed from a direction of arrow mark 11 to that of arrow mark 12 so as to oppose the flowing direction of the reacting air so that the fuel pole cell 3 and the air pole cell 5 whose temperatures are elevated due to internal heat generation, can be cooled effectively.

In the above-mentioned cell structure, the fuel pole 2 is provided with a rectangular-flanged fuel pole interconnector 16 which is formed by extending an end of the fuel pole along the partition wall end of the fuel pole cell 3 at an edge surface side of the honeycomb 1, and at the other edge surface side of the honeycomb body 1, the length of the fuel pole is made dimension X shorter than the entire length of the honeycomb 1. The air pole 4 is provide with a rectangular-flanged fuel pole interconnector 15 which is formed by extending the air pole along the partition wall end of the air pole cell 4 at the other edge surface side of the honeycomb 1 so as to oppose the interconnector of the fuel pole 3, and the length of the air pole is made dimension Y shorter than the entire length of the honeycomb body 1 at the other edge surface side of the honeycomb body 1. By forming the fuel pole 2 and the air pole 4 as described above, a honeycomb fuel cell 17 is formed.

The dimension X and the dimension Y are determined appropriately in consideration of the material of honeycomb and the conductivity of fuel. However, they are preferably in a range of from about 0.5 to 5.0 mm. When the areas (the dimension X and the dimension Y) where there is provided neither the fuel pole 2 nor the air pole 4, are provided in the above-mentioned range in the fuel pole cell 3 and the air pole cell 5, the electrical insulation between the same kinds of poles (i.e., a fuel pole and a fuel pole, or an air pole and an air pole) of adjacent honeycomb fuel cells 17 can be maintained in a case that a plurality of honeycomb fuel cells 17 are stacked as described later.

These interconnectors 16 and 15 of the honeycomb fuel cell 17 may be made of the same material as the fuel pole 2 and the air pole 4 respectively. However, since the side facing the fuel pole 3 is exposed to a strong reduction atmosphere and the side facing the reacting air pole cell 5 is exposed to a strong oxidation atmosphere, it is preferable to use a material durable to both the reduction and oxidation atmospheres. Such material may, for example, be an oxide material such as $LaCrO_3$, $La_{0.8}Ca_{0.2}CrO_3$ or $La_{0.7}Sr_{0.3}CrO_3$, noble metal such as gold (AU) or silver (Ag) or a heat-resisting steel such as inconel or stainless steel.

Figure 3:
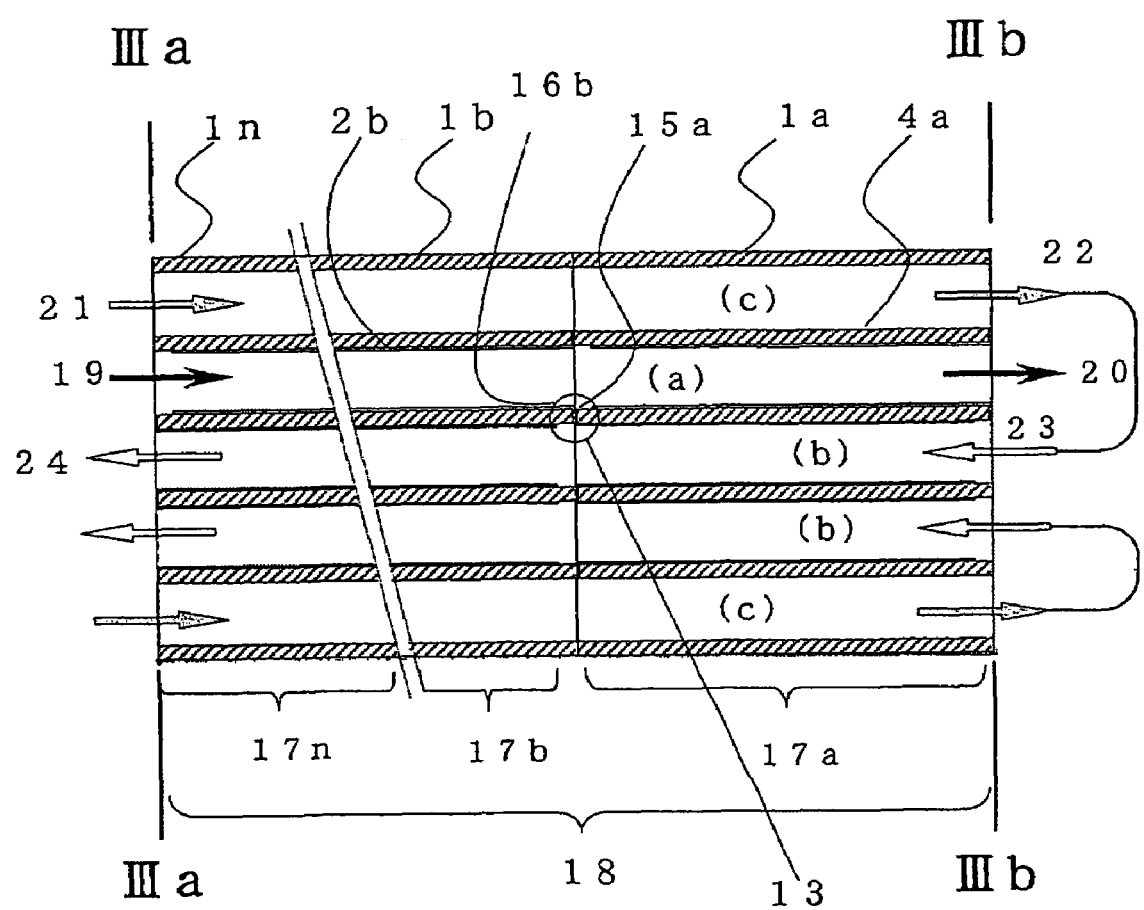
FIG. 3 is a simplified cross-sectional view taken along the line I-I in FIG. 1, of a stacked fuel cell according to the present invention.

FIG. 3 shows the structure and function of an applied example of the solid-oxide fuel cell of the present invention. A first stage honeycomb fuel cell 17a and a second stage honeycomb fuel cell 17b are stacked so that an air pole interconnector 15a of the fuel cell 17a and a fuel pole interconnector 16b of the second fuel 17b are connected to each other. By stacking fuel cells n-stages in the same manner as above, a stacked type honeycomb fuel cell 18 in which an n number of honeycomb fuel cells 17 are connected in series is obtainable.

The connecting portions between the air pole interconnector 15a and the fuel pole interconnector 16b at surfaces to be stacked are unified by means of compression or joining to thereby form an interconnector 13 (see FIG. 3).

In the connection of the air pole interconnector 15 to the fuel pole interconnector 16, a structure that left and right parts in the structure shown in FIG. 3 are exchanged, namely, a structure that a fuel pole interconnector 16n exposes at a left end surface of the stacked type honeycomb fuel cell 18, and the air pole interconnector 15a exposes at a right end surface of it, may be employed.

Fuel supplied to this stacked type honeycomb fuel cell 18 is supplied into a fuel pole cell (a) in a direction of arrow mark 19 from a IIIa-face-side shown in FIG. 3 and runs out along a direction of arrow mark 20 as a gas mixture comprising water vapor ($H_2O$), unreacted hydrogen ($H_2$), carbon dioxide ($CO_2$) and nitrogen ($N_2$) or a gas mixture comprising water vapor, unreacted hydrogen and carbon dioxide, produced by electrochemical reaction at the fuel pole.

On the other hand, cooling air to cool the inner portion of the stacked type honeycomb fuel cell 18 is supplied into a cooling air cell (c) from the IIIa-face-side in a direction of arrow mark 21 which is the same direction of flowing the fuel, to thereby cool the wall surface of the cooling air cell while the temperature of the cooling air itself increases. The air after cooling the wall surface of the cell runs out from an end face IIIb along a direction of arrow mark 22.

The air of elevated temperature run out in the direction of arrow mark 22 is deflected to a reverse direction to flow from the end face IIIb into an air pole cell (b) in a direction of arrow mark 23. Then, the air of elevated temperature supplies oxygen to the air pole 4 and runs out through the end face IIIa of the air pole cell (b) along a direction of arrow mark 24 while the oxygen concentration of the supplied air decreases.

The number of stacked honeycomb fuel cells 17 to constitute the stacked type honeycomb fuel cell 18 is determined optimally in consideration of the length of cells constituting a honeycomb fuel cell 17, a required output voltage, an electrolyte material selected, the size of cells of the honeycomb, the percentage of unreacted fuel in exhaust fuel, the heat balance in the entire system and economical efficiency of the entire system. Although the number of stacking of the stacked type honeycomb fuel cell 18 is not specified, a number of from 3 to 10 is generally suitable.

As the solid-oxide material for the honeycomb 1, yttria-stabilized zirconia (YSZ), scandium-stabilized zirconia (ScSZ), lanthanum gallate type solid-oxide material (LSGM, LSGMC), $C12A7(12C_aO·7Al_2O_3)$ or the like may be mentioned. As LSGM $La_{0.8}Sr_{0.2}Ga_{0.8}Mg_{0.2}O_x$ and $La_{0.9}Sr_{0.1}Ga_{0.8}Mg_{0.2}O_x$ is exemplified. Further, as LSGMC, $La_{0.8}Sr_{0.2}Ga_{0.8}Mg_{0.15}Co_{0.05}O_x$ and $La_{0.9}Sr_{0.1}Ga_{0.8}Mg_{0.15}CO_{0.05}O_x$ may be exemplified. Further, as YSZ, 8 mol % $Y_2O_3·ZrO_2$ in which $Y_2O_3$ is doped in $ZrO_2$, and as ScSZ, 8 mol % $Sc_2O_3·3ZrO_2$ are preferably used, for example. These compositions are materials having $O^-$ or $O^{2-}$-ion conductive properties. However, a material having $H^+$ or $H^-$-ion conductive properties which has been studied in recent years is also included in the solid-oxide material defined in the present invention.

As material for the electrode film, well-known materials can be used. For example, Ni or Ni cermet for the anode (fuel pole), and $LaMnO_3$, $La_{0.8}Sr_{0.2}MnO_3$, $LaCoO_3$ or $La_{0.5}Sr_{0.5}CoO_3$ for the cathode (air pole) may be mentioned respectively as preferred materials.

Description with reference to FIGS. 1 to 3 concerns about the solid-oxide material as the material for the honeycomb 1. However, the honeycomb 1 may be made of an air pole material. In this case, an electrolyte material is coated on or joined to the inner surface of a fuel pole cell and further, a fuel pole material is coated on or joined to it to form a two-layer structure. Or, the honeycomb 1 may be made of a fuel pole material and an electrolyte material may be coated on or joined to the inner surface of an air pole cell and further an air pole material be coated on or joined to it to form a two-layer structure.

EXAMPLE

Figure 4:
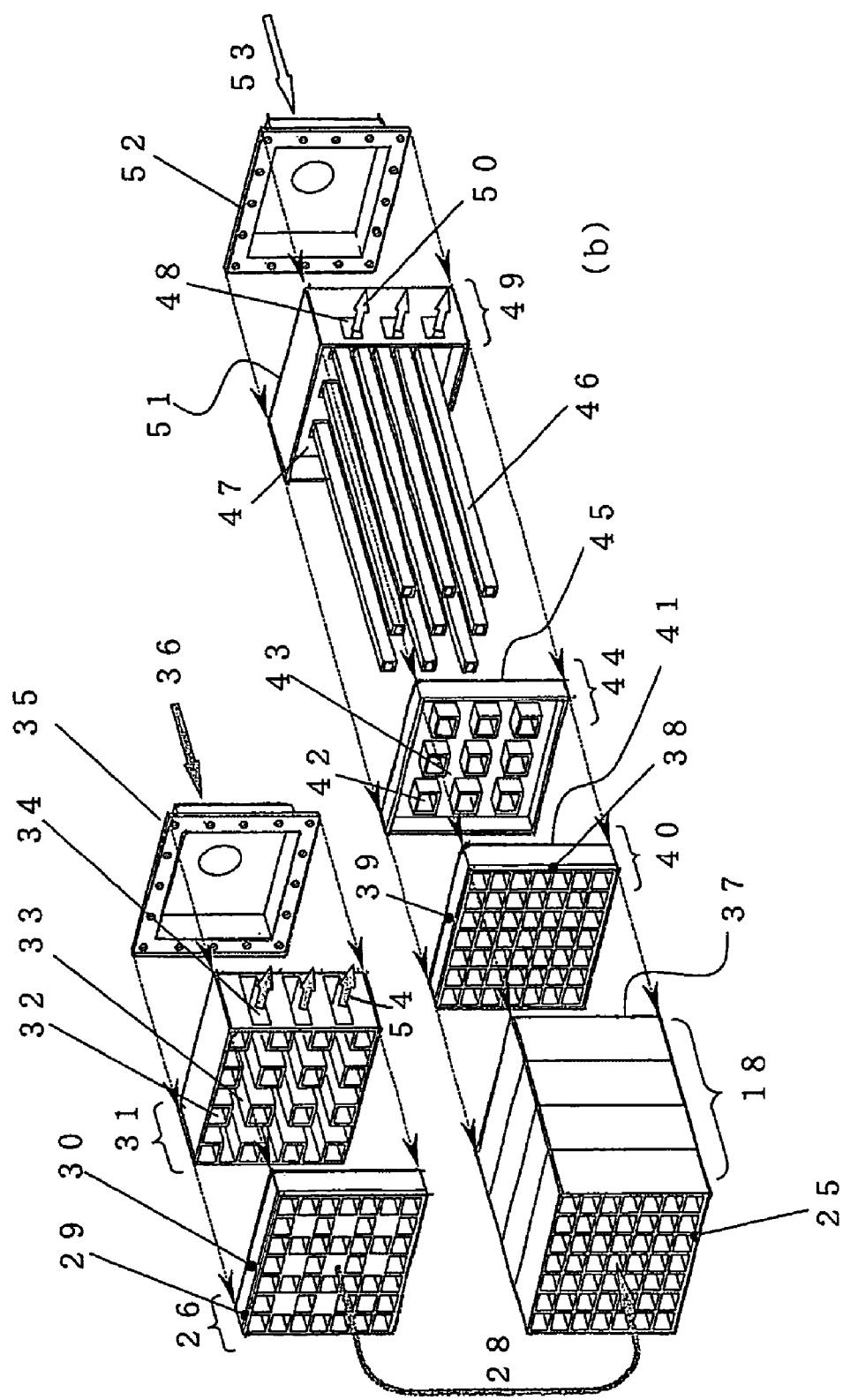
FIG. 4 is a perspective view showing an example of the structure of a fuel cell unit comprising a stacked fuel cell according to the present invention.

An example of the solid-oxide fuel cell of the present invention will be described in more detail with reference to FIG. 4. The stacked type honeycomb fuel cell 18 shown in FIGS. 1 to 3 has the honeycomb structural body comprising cells of 5 rows and 5 columns. On the other hand, FIG. 4 shows the structure comprising cells of 7 rows and 7 columns, which is likely to be used practically. The structure and function in this embodiment, except for this point are substantially the same as those described with reference to FIGS. 1 to 3.

FIG. 4 shows a fuel cell depicted in a separate state to be two stages in vertical direction. However, the arrangement of two stages is made for descriptive purpose of the figure and in fact, all structural elements are connected linearly on a single center line.

The stacked type honeycomb fuel cell 18 has an air inlet/outlet-side end surface 25 to which a honeycomb-shaped air inlet/outlet-side collecting/insulating unit 26 in which only fuel passages are closed is connected along an arrow mark 28, and they are integrated.

The air inlet/outlet-side collecting/insulating unit 26 having a first collector 29 and an insulator 30 is connected at its upstream side with an air inlet/outlet unit 31. The air inlet/outlet unit 31 has a space 33 in which cooling air conduits 32 communicated with the cooling air cells 6 (see FIG. 1) are provided and exhaust ports 34 so that exhaust air from the fuel cell is discharged through the exhaust ports 34 in a direction of arrow mark 54.

Cooling air is supplied to a header 35 along an arrow mark 36 to be distributed substantially equally to the cooling air conduits 32 communicated with the header 35. Then, distributed cooling air is passed through the collecting/insulating unit 26 to be supplied to the stacked type honeycomb fuel cell 18.

On the other hand, the stacked type honeycomb fuel cell 18 has a fuel-supply-side end surface 37 to which a fuel-supply-side collecting/insulating unit 40 which have the same cross-sectional shape of cell as the stacked type honeycomb fuel cell 18 having cells penetrated and which is provided with a second collector 38 and an insulator 39, is connected. The collecting/insulating unit 40 has a fuel-supply-side end surface 41 to which an air reversing unit 44 having an air reversing chamber 43 in which fuel pole conduits 42 are inserted to be communicated with the fuel pole cells, is connected. Air passing through the cooling air cells is gathered into the air reversing chamber 43, and the flowing direction of the air is reversed to flow into the air pole cells.

A fuel exhaust gas unit 49 is connected to an end surface 45 of the air reversing unit 44. The fuel exhaust gas unit 49 is provided with fuel supply pipes 46, a fuel exhaust collecting chamber 47 and fuel exhaust gas outlets 48. The fuel supply pipes 46 penetrate the fuel pole conduits 42 inserted in the air reversing unit 44, cells communicated with the fuel poles, of the collecting/insulating unit 40 and the fuel pole cells of the stacked type honeycomb fuel cell 18 to extend in the vicinity of the air inlet/outlet-side end surface 25 of the stacked type honeycomb fuel cell 18 wherein there are appropriate gaps between the fuel supply pipes and the fuel poles.

At the air inlet/outlet-side end surface 25 of the stacked type honeycomb fuel cell 18, the fuel exhaust gas is reversed to be passed through the gaps between the fuel supply pipes 46 and the fuel poles 2 (see FIG. 1) during which power generation takes place by the reaction of the fuel exhaust gas with reacting air. The fuel exhaust gas after power generation is collected in the fuel exhaust collecting chamber 47 and is discharged through the fuel exhaust gas outlets 48 in a direction of arrow mark 50. A fuel supply header 52 is connected to a fuel-inlet-side end surface 51 of the fuel exhaust collecting chamber 47. Fuel supplied to the fuel supply header 52 along an arrow mark 53 is distributed in the fuel supply header 52 substantially equally into the fuel supply pipes 46. A fuel reforming catalyst, for example, a catalyst in which nickel (Ni) is dispersedly supported by a ceramic substrate is filled in the fuel supply pipes 46 so that the fuel gas passing through the fuel supply pipes is reformed to be a gas mixture of $H_2$ and CO by the catalyst. Accordingly, the reformed gas can be supplied to the fuel poles without depositing carbon (C).

The exhaust air discharged along an arrow mark 54 and fuel exhaust gas discharged along an arrow mark 50 are passed through pipes (not shown) or a structural space (not shown), and they are mixed and ignited in a combustor (not shown) and is discharged in atmosphere.

The exhaust gas having been passed through the combustor to be mixed and ignited may be used for preheating cooling air in a heat exchanger (not shown) so as to recover heat. Further, the exhaust gas having been mixed and ignited in the combustor may be introduced into a gas turbine (not shown) comprising an air compressor and a turbine to compress cooling air so as to maintain the entire system to be a pressurized state and to improve power generation efficiency as well as making the system compact.

In the solid-oxide fuel cell shown in FIG. 4, functional parts which constitute the solid-oxide fuel cell, such as the honeycomb type fuel cell, the first collector, the second collector, the air reversing chamber, the exhaust fuel collecting chamber and the fuel supply pipes are manufactured as separate parts. However, a plurality of functional parts may appropriately be integrated without manufacturing them as separate parts if they can be formed integrally or they can be joined integrally.

Figure 5:
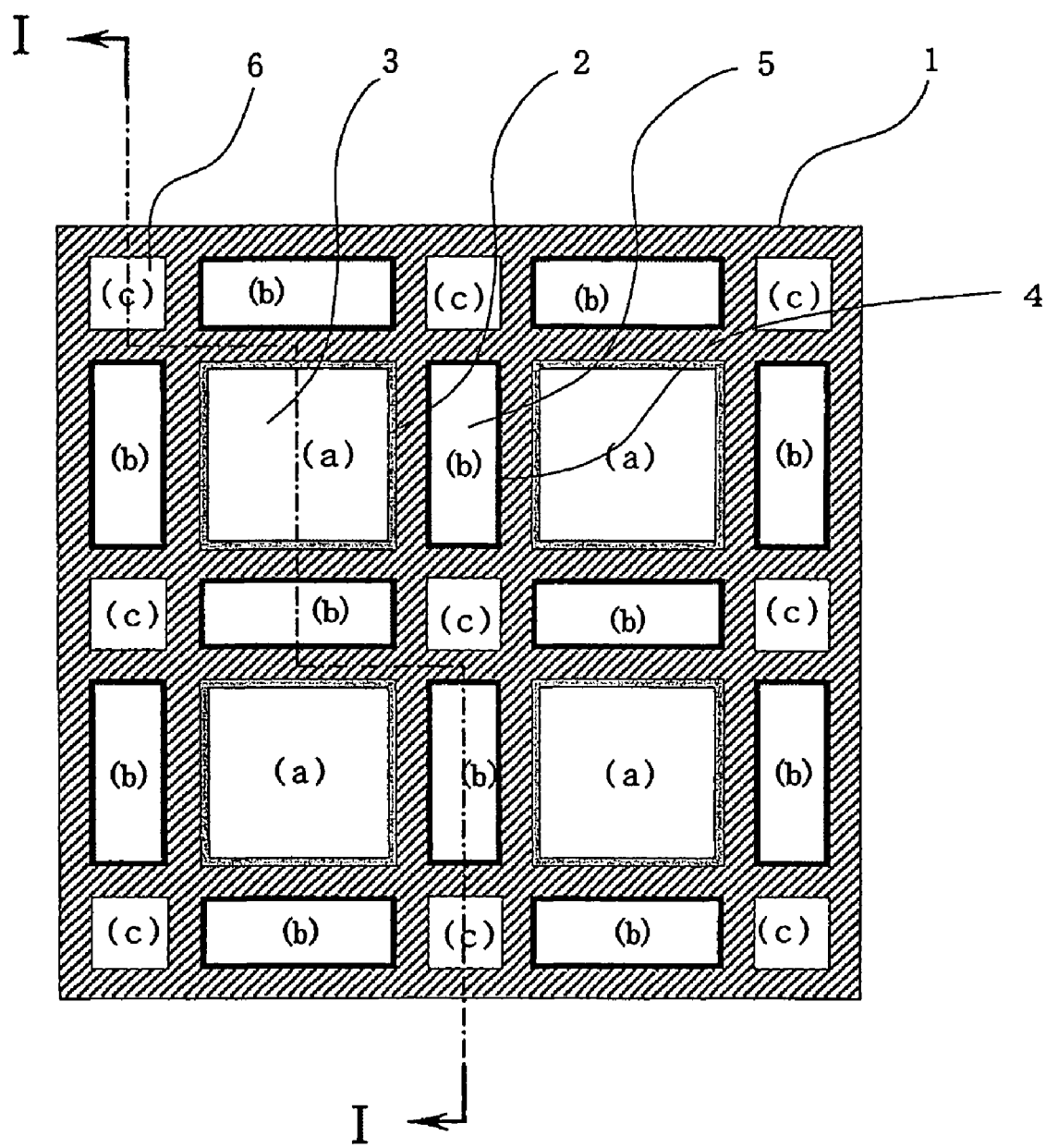
FIG. 5 is a simplified cross-sectional view of the fuel cell according to another embodiment of the present invention.

In this Example, description is made about a square-shaped honeycomb in which a cooling air cell, a fuel pole cell and an air pole cell have the same cross-sectional shape. However, it is not always necessary to form these cells to have the same cross-sectional shape as far as these cells can achieve the purpose of the present invention. For example, the cross-sectional shape of cell may be changed depending on kinds of cells a, b and c as shown in FIG. 5. Namely, the cross-sectional shape of the fuel pole cell 3 may be square, the cross-sectional shape of the air pole cell 5 may be rectangular using a wall surface of the fuel pole cell 3 as a longer side, and the cross-sectional shape of the cooling air cell 6 may be square using a shorter side of the cooling air cell 5 as its sides or may be circular using a shorter side of the air pole cell 5 as its diameter. The cross-sectional view taken along a line I-I in FIG. 5 is omitted because it is substantially the same as FIG. 2 except that the cell width is different depending on the kinds of cells.

By changing the cross-sectional shapes of the cells of the honeycomb 1 depending on the kinds of cells and by increasing relatively the cross-sectional area or the volume of the fuel pole cell 3, an output per unit volume of the fuel cell can be increased. When the cross-sectional area of the fuel pole cell 3 is increased, the cross-sectional area of each of the air pole cell 5 and the cooling air cell 6 is smaller than that of the fuel pole cell 3, in particular, the cross-sectional area of the cooling air cell 6 is reduced. However, the cross-sectional area of the cooling air cell 6 should be reduced within a range not to cause trouble in the operation of the fuel cell, by analyzing the temperature distribution or experiments on cooling air cell 6.

Figure 6:
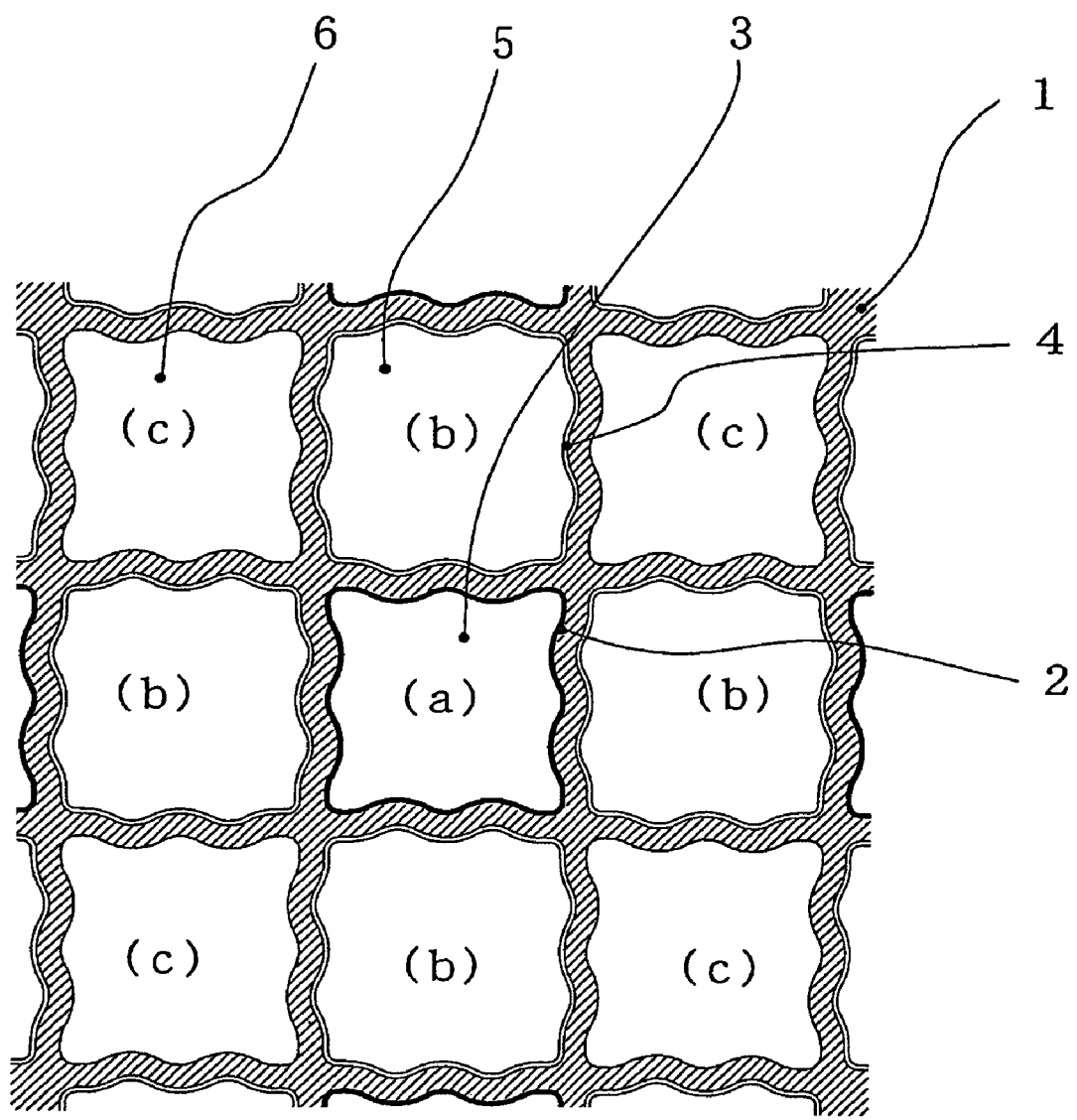
FIG. 6 is a simplified cross-sectional view of the fuel cell according to another embodiment of the present invention.

Further, a part or the entirety of each side of cells having a rectangular shape in cross-section may be curved or corrugated into a modified rectangular shape as shown in FIG. 6 as an example. Further, this modified rectangular shape may be combined with any of different rectangular shapes as shown in FIG. 5. Thus, by increasing the cross-sectional area of fuel pole cell of the honeycomb 1, an output per unit volume of the fuel cell can further be increased.

INDUSTRIAL APPLICABILITY

Figure 7:
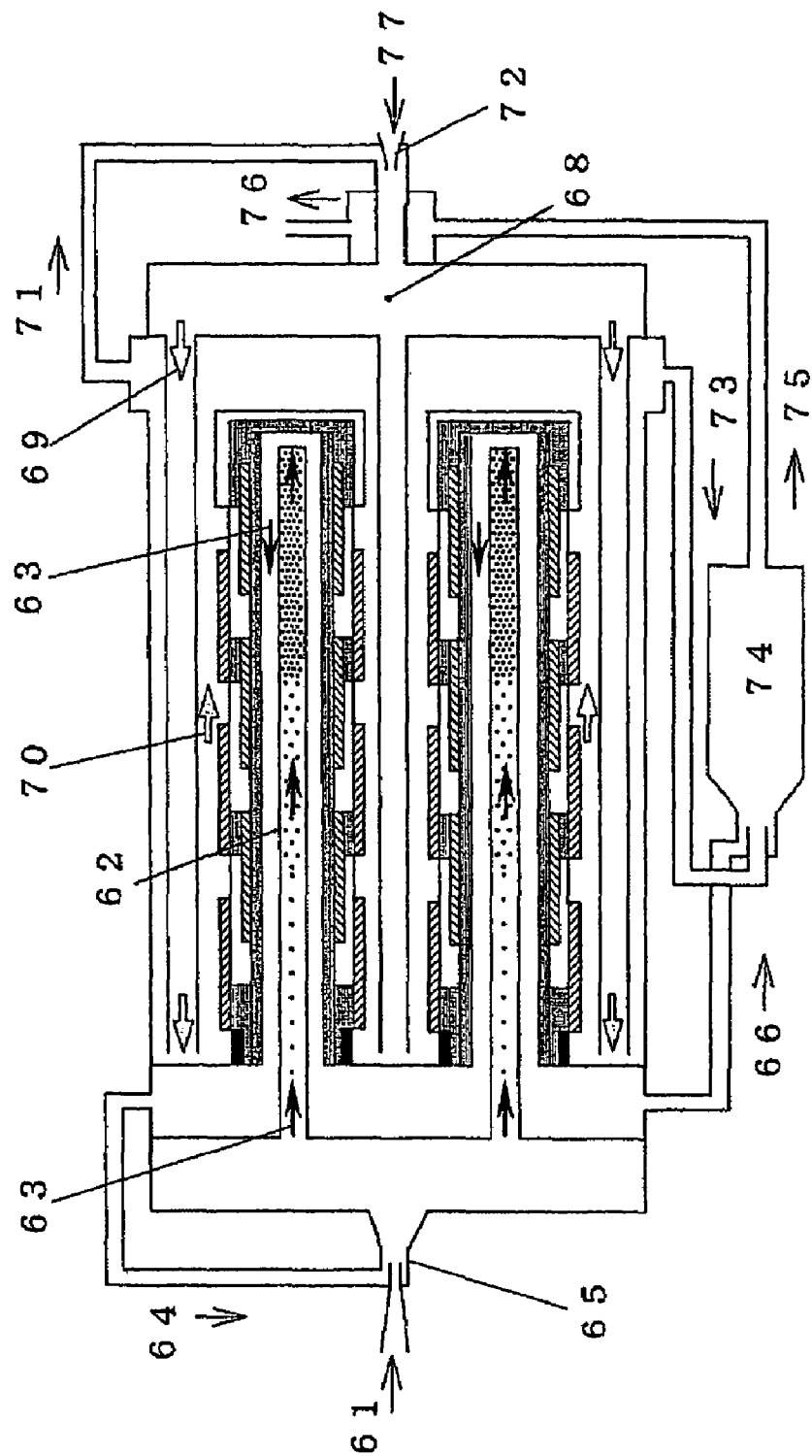
FIG. 7 is a cross-sectional view as well as a systematic view of SOFC according to a conventional technique.

As described above, according to the present invention, it is unnecessary to suck exhaust fuel gas from fuel and exhaust air from reacting air and to circulate them with low concentrations unlike the conventional technique as shown in FIG. 7. Accordingly, fuel of high concentration and air of high oxygen concentration can be used whereby power generation output per unit volume is improved and a fuel cell being small in size and light in weight is obtainable.

Further, the concentration of unreacted fuel in the fuel exhaust gas and the concentration of oxygen in the air discharged from the fuel cell can remarkably be reduced. Further, the cooling air which draws heat generated in the honeycomb thereby to have an elevated temperature is supplied to the air pole cell after reversing its flowing direction, and the cooling air can be used as reacting air for the fuel cell. Accordingly, heat can be recovered, and power generation efficiency is improved remarkably. Further, since the cooling air can cool uniformly the inside of the honeycomb, the temperature difference between the inner portion of the honeycomb and the outer peripheral portion of the honeycomb is minimized with the result that a thermal stress can remarkably be reduced. Accordingly, rapid starting becomes possible and rapid follow-up is possible even if there is a rapid change of load.

In addition, since it is unnecessary to drive the venturis as the conventional technique as shown in FIG. 7, the pressure loss of the fuel gas as well as air can be reduced, and accordingly, power necessary to activate the fuel cell can be minimized.

The invention claimed is:

1. A honeycomb type solid-oxide fuel cell formed of any of a solid-oxide material, a fuel pole material and an air pole material and having a honeycomb structural body comprising rectangular cells in cross section, wherein cells adjacent to wall surfaces constituting a fuel pole cell of the fuel cell function as air pole cells and cells adjacent to the corners of wall surfaces of the fuel pole cell and adjacent to wall surfaces of an air pole cell function as cooling air cells, whereby fuel pole cells, air pole cells and cooling air cells are arranged in longitudinal and lateral directions so that cells of the same type appear in every other location.

2. A honeycomb type solid-oxide fuel cell having fuel pole cells, air pole cells and cooling air cells which form a honeycomb structural body comprising square cells in cross section, said honeycomb structural body being made of any of a solid-oxide material, a fuel pole material and an air pole material, wherein a fuel cell group is formed by stacking at least two honeycomb type fuel cells in each of which cells adjacent to wall surfaces constituting a fuel pole cell of the fuel cell function as air pole cells and cells adjacent to the corners of wall surfaces of the fuel pole cell and adjacent to wall surfaces of an air pole cell function as cooling air cells, whereby fuel pole cells, air pole cells and cooling air cells are arranged in longitudinal and lateral directions so that cells of the same type appear in every other location, and fuel poles and air poles of the mutually adjacent honeycomb type fuel cells are connected with inter-connectors to form a series connection so that an electric power is taken by collectors provided at both ends of said group of the fuel cells.

3. The honeycomb type solid-oxide fuel cell according to claim 1, wherein the honeycomb structural body is made of a solid-oxide material, the fuel pole cells are formed by providing a fuel pole on the inner surfaces of cells of the honeycomb structural body and the air pole cells are formed by providing an air pole on the inner surfaces of the cells which are adjacent to the wall surfaces of the fuel pole cells.

4. The honeycomb type solid-oxide fuel cell according to claim 1, wherein the cells have the same square shape in cross section.

5. The honeycomb type solid-oxide fuel cell according to claim 1, wherein the fuel pole cells have a square shape in cross section, the air pole cells have a rectangular shape in cross section and have a wall surface of the fuel pole cell as a longer side, and the cooling air cells have a square shape in cross section and have a shorter side of the air pole cells as a side, or have a circular shape the diameter of which is the same as the shorter side of the air pole cells.

6. The honeycomb type solid-oxide fuel cell according to claim 1, wherein a part or the entirety of the wall surfaces of the fuel pole cells, the air pole cells and the cooling air cells each having a rectangular shape in cross section is curved or corrugated.

7. The honeycomb type solid-oxide fuel cell according to claim 2, wherein a first collector provided with fuel cell closing surfaces and flow passages for the air pole cells and the cooling air cells is connected to an end of the honeycomb type fuel cell located at an end of the fuel cell group, and an air inlet/outlet unit in which cooling air conduits are inserted is connected to the first collector;

a second collector in which flow passages for the fuel pole cells, flow passages for the air pole cells and flow passages for the cooling air cells are formed is connected to an end of the honeycomb type fuel cell located at the other end of the fuel cell group; an air reversing chamber and an exhaust fuel collecting chamber through which fuel supply pipes are penetrated are connected sequentially to the second collector, and a fuel supply header for supplying fuel is connected to the exhaust fuel collecting chamber, and, the fuel supply pipes which extend from an end of the exhaust fuel collecting chamber through the air reversing chamber and the second collector to the vicinity of the air inlet/outlet-side surface of the fuel pole cells are inserted into the fuel pole cells with gaps to the inner surfaces of the cells.

8. The honeycomb type solid-oxide fuel cell according to claim 1, wherein the direction of air flowing in the cooling air cells is made opposite to the direction of reacting air flowing in the air pole cells to form a counter flow.

9. The honeycomb type solid-oxide fuel cell according to claim 7, wherein a plurality of functional parts of the constituent members comprising the honeycomb type fuel cells, the first collector, the second collector, the air reversing chamber, the exhaust fuel collecting chamber and the fuel supply pipes which constitute the honeycomb type solid-oxide fuel cell, are formed integrally or connected integrally.

10. The honeycomb type solid-oxide fuel cell according to claim 7, wherein a fuel reforming catalyst is filled in the fuel supply pipes for the reformulation of the fuel in the fuel supply pipes.

11. The honeycomb type solid-oxide fuel cell according to claim 1 wherein the solid electrolyte is yttria-stabilized zirconia (YSZ), scandium-stabilized zirconia (ScSZ), a lanthanum gallate type solid electrolyte (LSGM, LSGMC), or a solid electrolyte of, e.g. C12A7(12CaO·7Al$_2$O$_3$) having O$^-$ or O$^{2-}$-ion conductive properties or a solid electrolyte having H$^+$ or H$^-$-ion conductive properties.

12. The honeycomb type solid-oxide fuel cell according to claim 11, wherein the lanthanum gallate type solid-oxide is $La_{0.8}Sr_{0.2}Ga_{0.8}Mg_{0.2}O_x$, $La_{0.9}Sr_{0.1}Ga_{0.8}Mg_{0.2}O_x$, $La_{0.8}Sr_{0.2}Ga_{0.8}Mg_{0.15}Co_{0.05}O_x$ or $La_{0.9}Sr_{0.1}Ga_{0.8}Mg_{0.15}Co_{0.05}O_x$.

* * * * *